United States Patent
Nomura et al.

(10) Patent No.: US 9,310,042 B2
(45) Date of Patent: Apr. 12, 2016

(54) VEHICLE HEADLAMP

(71) Applicant: KOITO MANUFACTURING CO., LTD., Tokyo (JP)

(72) Inventors: Yukio Nomura, Shizuoka (JP); Masaaki Nakabayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 166 days.

(21) Appl. No.: 14/056,086

(22) Filed: Oct. 17, 2013

(65) Prior Publication Data

US 2014/0112011 A1    Apr. 24, 2014

(30) Foreign Application Priority Data

Oct. 24, 2012  (JP) ................................. 2012-234862
Oct. 24, 2012  (JP) ................................. 2012-234863

(51) Int. Cl.
  *F21S 8/10* (2006.01)
  *B60Q 1/068* (2006.01)
  *B60Q 1/076* (2006.01)

(52) U.S. Cl.
  CPC ........... *F21S 48/1742* (2013.01); *B60Q 1/0683* (2013.01); *B60Q 1/076* (2013.01); *B60Q 2200/30* (2013.01)

(58) Field of Classification Search
  CPC ............ F21S 48/1742; F21S 48/1736; B60Q 1/06–1/124; B60Q 2200/30; B60Q 2200/32
  See application file for complete search history.

(56) References Cited

U.S. PATENT DOCUMENTS

| | | | |
|---|---|---|---|
| 5,769,525 A * | 6/1998 | Daumueller et al. | 362/475 |
| 6,152,584 A * | 11/2000 | Tsukamoto | 362/465 |
| 6,663,268 B1 | 12/2003 | Toda et al. | |
| 7,575,352 B2 * | 8/2009 | Sato et al. | 362/514 |
| 7,618,174 B2 * | 11/2009 | Yasuda et al. | 362/545 |
| 7,896,512 B2 * | 3/2011 | Tatara et al. | 362/43 |
| 2011/0063866 A1 * | 3/2011 | Shibata et al. | 362/523 |

FOREIGN PATENT DOCUMENTS

| | | |
|---|---|---|
| CN | 102628576 A | 8/2012 |
| EP | 2338728 A1 | 6/2011 |
| JP | 2001130315 A | 5/2001 |
| JP | 2010067556 A * | 3/2010 |
| JP | 2011-060730 A | 3/2011 |
| JP | 2011150993 A | 8/2011 |

OTHER PUBLICATIONS

JP 2010-067556 A, Shibata et al, Mar. 24, 2011, English machine translation document of AIPN JPO.*

Office Action dated Jul. 3, 2015, issued by the State Intellectual Property Office of the People's Republic of China in counterpart Chinese Application No. 201310507245.9.

* cited by examiner

*Primary Examiner* — Alan Cariaso
(74) *Attorney, Agent, or Firm* — Sughrue Mion, PLLC

(57) ABSTRACT

A vehicle headlamp includes a lamp outer case 4, a holding plate 12, a lamp unit 6, and an optical axis adjustment mechanism 16. The lamp outer case 4 includes a lamp housing 2 formed with an opening on at least one side thereof and a cover 3 covers the opening of the lamp housing 2. The holding plate 12 is pivotable in at least one of an up-down direction and a right-left direction. The lamp unit 6 is attached to the holding plate 12 and includes a light source 10*b*. The optical axis adjustment mechanism 16 is disposed below the lamp unit 6 and adjusts an optical axis direction of the lamp unit 6.

23 Claims, 12 Drawing Sheets

VEHICLE HEADLAMP

CROSS REFERENCE TO RELATED APPLICATION(S)

This application is based on and claims priority under 35 U.S.C. §119 to Japanese Patent Application Nos. 2012-234862 and 2012-234863 (both filed on Oct. 24, 2012), the entire contents of which are incorporated herein by reference.

BACKGROUND

1. Technical Field

The invention relates to a vehicle headlamp. More specifically, the invention relates to a technical field of a vehicle headlamp including a lamp unit and a light amount adjustment mechanism.

2. Related Art

There has been a vehicle headlamp in which a lamp unit including a light source and the like are disposed in a lamp outer case formed of a cover and a lamp housing, for example.

Also, there has been a vehicle headlamp in which an optical axis adjustment mechanism such as (i) an aiming mechanism for performing initial adjustment of an optical axis direction or (ii) a leveling mechanism for adjusting the optical axis direction that changes depending on a weight of on-vehicle objects is disposed (for example, see JP 2001-130315 A (corresponding to U.S. Pat. No. 6,663,268).

The vehicle headlamp described in JP 2001-130315 A includes an aiming mechanism and a leveling mechanism. The aiming mechanism and the leveling mechanism are arranged on a rear side of the lamp unit.

SUMMARY

However, in a case where the optical axis adjustment mechanism is disposed on the rear side of the lamp unit as in the vehicle headlamp described in JP 2001-130315 A, the lamp unit and the optical axis adjustment mechanism are arranged in a front-back direction. Therefore, the entire vehicle headlamp is long in the front-back direction. Consequently, size reduction of the vehicle headlamp is inhibited.

Particularly, since the optical axis adjustment mechanism includes an aiming shaft and a leveling shaft that respectively extend in the front-back direction, the size (length) of the entire vehicle headlamp in the front-back direction is likely to be increased.

The invention provides a vehicle headlamp that overcomes the above-described concerns and that can reduce its size in the front-back direction.

According to one aspect of the invention, a vehicle headlamp includes a lamp outer case, a holding plate, a lamp unit, and an optical axis adjustment mechanism. The lamp outer case includes a lamp housing and a cover. The lamp housing is formed with an opening on at least one side thereof. The cover covers the opening of the lamp housing. The holding plate is pivotable in at least one of an up-down direction and a right-left direction. The lamp unit is attached to the holding plate and includes a light source. The optical axis adjustment mechanism is disposed below the lamp unit and adjusts an optical axis direction of the lamp unit.

Accordingly, in the vehicle headlamp, the lamp unit and the optical axis adjustment mechanism are positioned one above the other.

(1) A vehicle headlamp includes a lamp outer case, a holding plate, a lamp unit, and an optical axis adjustment mechanism. The lamp outer case includes a lamp housing and a cover. The lamp housing is formed with an opening on at least one side thereof. The cover covers the opening of the lamp housing. The holding plate is pivotable in at least one of an up-down direction and a right-left direction. The lamp unit is attached to the holding plate and includes a light source. The optical axis adjustment mechanism is disposed below the lamp unit and adjusts an optical axis direction of the lamp unit.

With this configuration, the lamp unit and the optical axis adjustment mechanism are arranged one above the other. Therefore, it is possible to reduce the size of the vehicle headlamp in a front-back direction.

(2) The holding plate may be pivotable in one of the up-down direction and the right-left direction. The optical axis adjustment mechanism may include a support plate that supports the holding plate so as to be pivotable in the one of the up-down direction and the right-left direction and that is pivotable in the other of the up-down direction and the right-left direction with respect to the lamp housing. When the holding plate is pivoted in the one of the up-down direction and the right-left direction, the optical axis direction may be adjusted in the up-down direction or the right-left direction by the optical axis adjustment mechanism. When the support plate and the holding plate are integrally pivoted in the other of the up-down direction and the right-left direction, the optical axis direction may be adjusted in the up-down direction or the right-left direction by the optical axis adjustment mechanism.

With this configuration, a pivot shaft for the up-down direction and a pivot shaft for the right-left direction are provided in different members. Therefore, twisting moment is less likely to occur at the time of pivoting in the up-down direction and the right-left direction. As a result, it is possible to ensure a smooth operation.

(3) The holding plate and the support plate may be arranged one above the other.

With this configuration, it is possible to further reduce the size of the vehicle headlamp in the front-back direction.

(4) The holding plate may include a holding part that holds the lamp unit. The holding part may have a frame shape that is penetrated in the up-down direction.

With this configuration, it is possible to reduce a weight of the vehicle headlamp while ensuring high rigidity of the holding plate.

(5) The holding plate may be provided integrally with a pivot fulcrum part for the up-down direction.

With this configuration, it is possible to achieve decrease in the manufacturing cost owing to reduction in the number of parts.

(6) The optical axis adjustment mechanism may include a cam part and a cam driving part that is slidably engaged with the cam part and that pivots the lamp unit in the up-down direction or the right-left direction.

(7) The holding plate may include a cam part. The optical axis adjustment mechanism may include a cam driving part that is slidably engaged with the cam part and that pivots the lamp unit in the up-down direction or the right-left direction.

With any of the configurations of (6) and (7), a cam mechanism is used as a mechanism for pivoting the lamp unit. Therefore, a degree of freedom of structural design is high, and limitation in the arrangement space of each part is less likely to occur. As a result, it is possible to reduce the size of the vehicle headlamp owing to improvement in a degree of freedom of design.

(8) The lamp unit may be disposed above the cam part and the cam driving part. The cam part may be pressed against the cam driving part due to a weight of the lamp unit.

With this configuration, it is possible to improve reliability in a pivot operation of the lamp unit while ensuring a size reduction in a longitudinal direction.

(9) The vehicle headlamp may further include a biasing part that presses the cam part against the cam driving part.

With this configuration, the cam part is pressed against the cam driving part by the biasing part. Therefore, both the cam part and the cam driving part surely slide against each other without rattling. For this reason, it is possible to prevent blurring of an optical axis due to the vibration or the like. Furthermore, collision between the cam part and the cam driving part due to vibration or the like does not occur. Therefore, it is possible to prevent damages or the like of both of the cam part and the cam driving part.

DETAILED DESCRIPTION

Hereinafter, exemplary embodiments will be described in detail with reference to the accompanying drawings.

First Embodiment

First, a vehicle headlamp 1 according to a first embodiment will be described (see FIGS. 1 to 3).

The vehicle headlamps 1 are respectively disposed and mounted on both right and left ends in a front end portion of a vehicle body.

Figure 1:
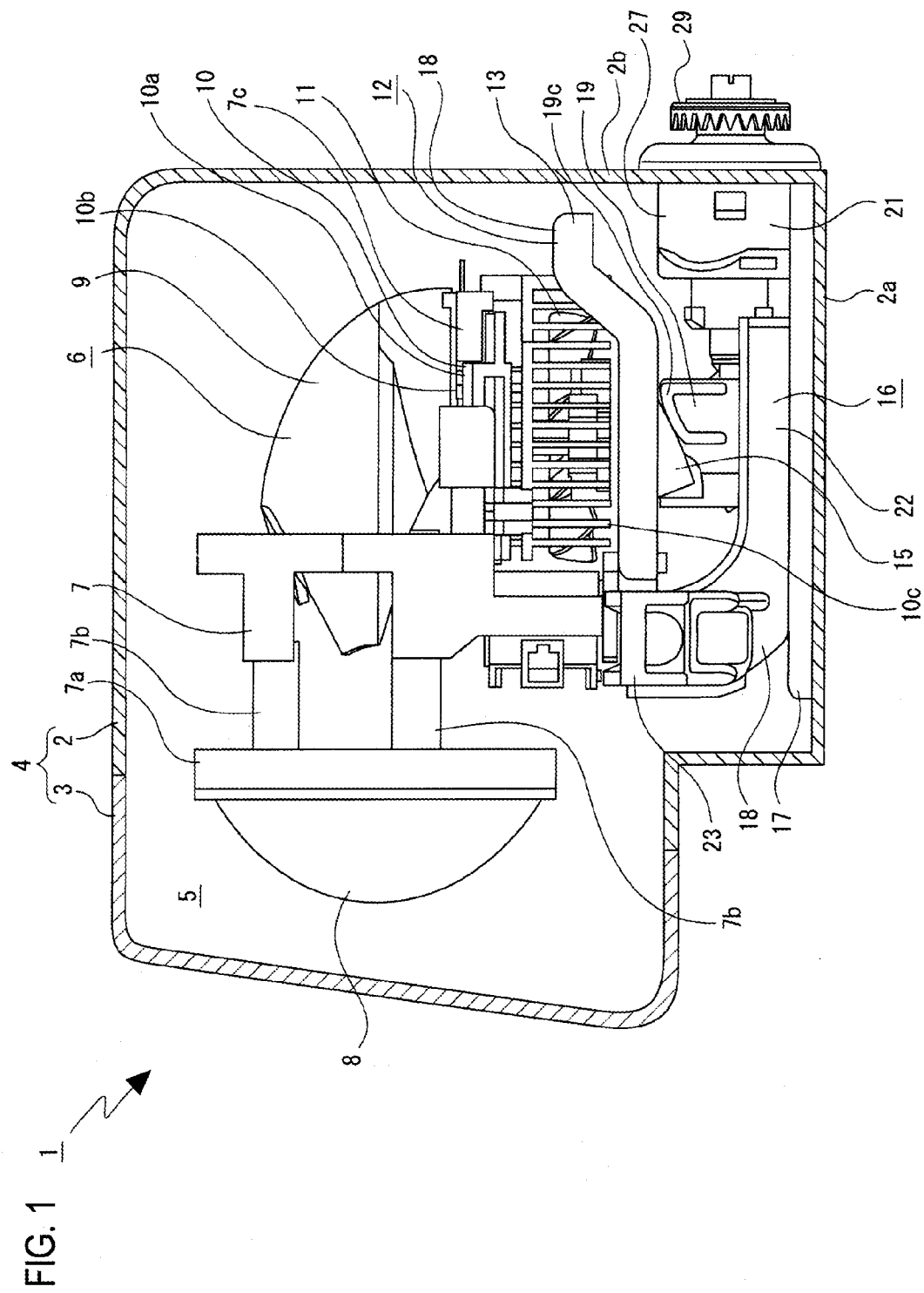
FIG. 1 is a side view of a vehicle headlamp according to a first embodiment, a part of which is drawn as a section view.

The vehicle headlamp 1 includes a lamp housing 2 and a cover 3 (see FIG. 1). The lamp housing 2 has a recess portion which is opened forward. The cover 3 closes the recess portion of the lamp housing 2. The lamp housing 2 and the cover 3 make up a lamp outer case 4. An interior space of the lamp outer case 4 is formed as a lamp chamber 5.

A lamp unit 6 includes a lens holder 7, a projection lens 8 held by the lens holder 7, a reflector 9 that reflects light, a light source unit 10 disposed below the reflector 9, and a cooling fan 11 attached to a lower surface of the light source unit 10.

The lens holder 7 includes a substantially ring-shaped lens attachment part 7a which is penetrated in a front-back direction, side parts 7b, 7b, . . . respectively which project rearward from both right and left end portions of the lens attachment part 7a, and a holding plate part 7c which is provided between the side parts 7b, 7b, . . . that are located on the right and left sides.

The projection lens 8 is formed in a substantially hemispherical shape and is attached to the lens attachment part 7a of the lens holder 7.

The reflector 9 has an inner surface which is formed as a reflective surface. The reflector 9 is attached to an upper surface of the light source unit 10.

The light source unit 10 is attached to the holding plate part 7c of the lens holder 7. The light source unit 10 includes a circuit board 10a and a light source 10b mounted on an upper surface of the circuit board 10a. For example, a light emitting diode (LED) is used as the light source 10b. A heat sink 10c is provided in the light source unit 10b and is located below the circuit board 10a.

The cooling fan 11 is disposed inside the heat sink 10c.

Figure 2:
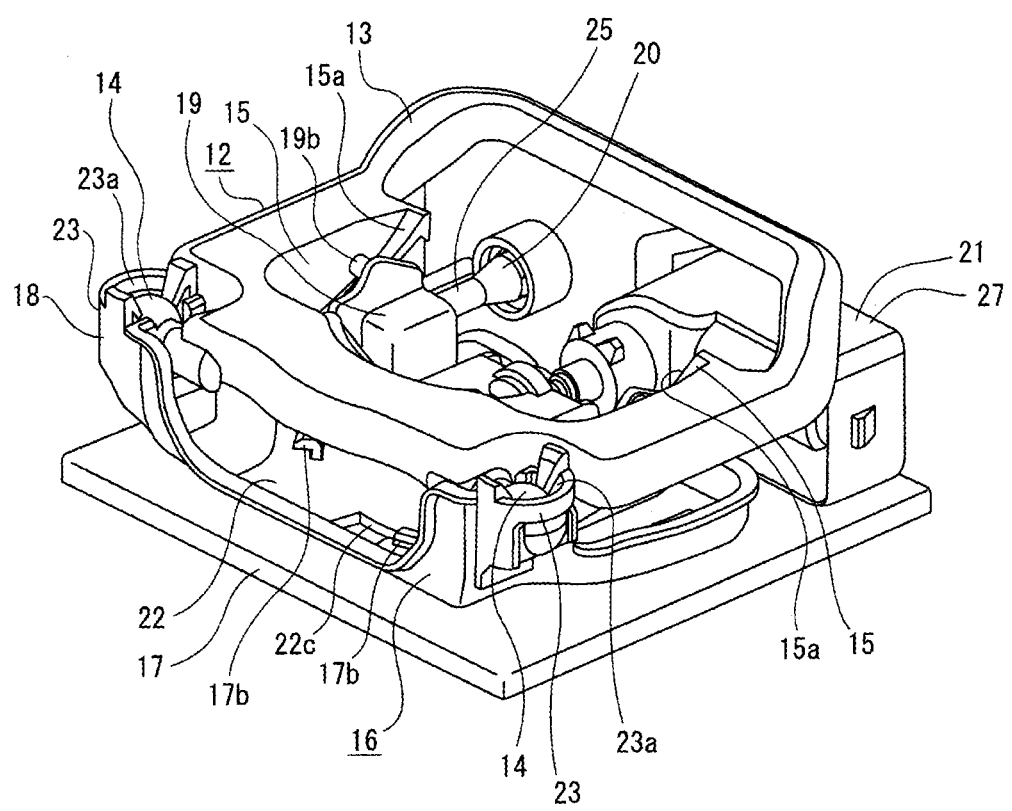
FIG. 2 is a perspective view showing a holding plate and an optical axis adjustment mechanism according to the first embodiment.
Figure 3:
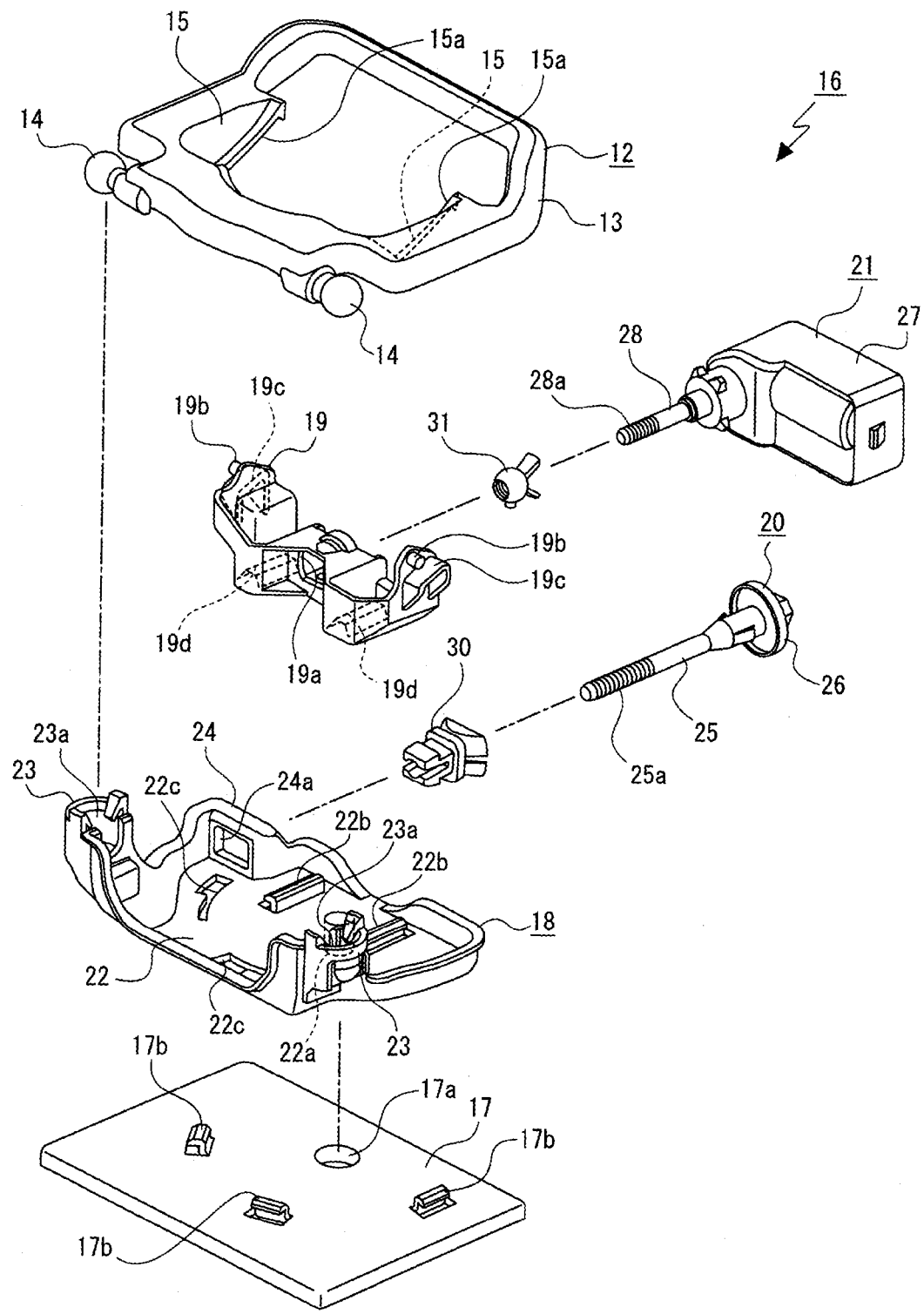
FIG. 3 is an exploded perspective view showing the holding plate and the optical axis adjustment mechanism according to the first embodiment.

The lamp unit 6 is attached to a holding plate 12 located on a lower side thereof and held (see FIGS. 1 to 3). The holding plate 12 includes a substantially rectangular frame-shaped holding part 13 which is penetrated in an up-down direction, pivot fulcrum parts 14, 14 which respectively project laterally (outward) from both right and left end portions in a front end portion of the holding part 13, and sliding engagement parts 15, 15 which project from the both right and left side edges of the holding part 13. In the holding plate 12, the holding part 13, the pivot fulcrum parts 14, 14, and the sliding engagement parts 15, 15 are integrally formed.

The sliding engagement parts 15, 15 respectively project downward from inner edges of both right and left side portions of the holding part 13 and are provided, at its lower end portions, with cam parts 15a, 15a. The cam parts 15a, 15a are inclined upward from the front side to the rear side.

An optical axis adjustment mechanism 16 is disposed below the lamp unit 6 (see FIG. 1). The optical axis adjustment mechanism 16 includes a base body 17, a support plate 18, a slider 19, an operation shaft 20, and an actuator 21 (see FIGS. 2 to 3).

The base body 17 has a substantially plate-like shape oriented in the up-down direction and is provided, at a rearward offset position, with a fulcrum hole 17a. Supporting ridges 17b, 17b, 17b are provided on the base body 17. The supporting ridges 17b, 17b, 17b are disposed on a circle centered at the supporting point hole 17a and are spaced from each other in the circumferential direction. The supporting ridges 17b, 17b, 17b project upward. The base body 17 is attached to a bottom surface 2a of the lamp housing 2. Also, the base body 17 may be integrated with the lamp housing 2.

The support plate 18 includes a substantially plate-like base surface part 22 oriented in the up-down direction, supporting protrusions 23, 23 which respectively project upward from both right and left end portions in a front end portion of the base surface part 22, and a nut attachment part 24 which project upward from a rear end portion of the base surface part 22. In the support plate 18, the base surface part 22, the supporting protrusions 23, 23 and the nut attachment part 24 are integrally formed.

A supported shaft 22a which project downward is provided at a rearward offset position in the base surface part 22.

Guiding protrusions 22b, 22b are provided at a rear end portion of the base surface part 22 so as to be spaced laterally from each other. The guiding protrusions 22b, 22b project upward and extend in the front-back direction. The base surface part 22 is formed with arc-shaped supported holes 22c, 22c, 22c that are spaced from each other in a circumferential direction.

The supporting protrusions 23, 23 are formed with support recesses 23a, 23a opened upward and laterally (inward direction).

The nut attachment part 24 is formed with an attachment hole 24a which is penetrated in the front-back direction.

The supported shaft 22a is inserted into the fulcrum hole 17a from above. Thereby, the support plate 18 is pivotably supported by the base body 17. The supported shaft 22a serves as a fulcrum. The supporting ridges 17b, 17b, 17b of the base body 17 is slidably engaged with the supported holes 22c, 22c, 22c of the support plate 18, respectively. Accordingly, detachment of the support plate 18 from the base body 17 is prevented.

The pivot fulcrum parts 14, 14 of the holding plate 12 are respectively inserted into the support recesses 23a, 23a of the support plate 18. Thereby, the holding plate 12 is pivotably supported by the support plate 18. The pivot fulcrum parts 14, 14 serve fulcrums.

The slider 19 has a transversely long shape. The slider 19 is formed, at its center in the right-left direction, with a holding hole 19a which is penetrated in the front-back direction. Engaging pins 19b, 19b and cam driving parts 19c, 19c project laterally (outward) from both right and left side surfaces of the slider 19. The engaging pins 19b, 19b and the cam driving parts 19c, 19c are spaced apart from each other in the up-down direction. The cam driving parts 19c, 19c are inclined upward from the front side to the rear side. At a lower surface of the slider 19, guided grooves 19d, 19d are formed so as to be spaced in the right-left direction from each other. The guided grooves 19d, 19d are opened downward and extend in the front-back direction.

The guiding protrusions 22b, 22b are respectively inserted into the guided grooves 19d, 19d. Thereby, the slider 19 is supported by the support plate 18 so as to be movable in the front-back direction. The cam parts 15a, 15a are respectively inserted between the engagement pins 19b, 19b and the cam driving parts 19c, 19c and the engagement pins 19b, 19b of the slider 19. Thereby, the cam driving parts 19c, 19c are slidable against the cam parts 15a, 15a. At this time, since the lamp unit 6 is disposed above the cam parts 15a, 15a and the cam driving parts 19c, 19c, the cam parts 15a, 15a are respectively pressed against the cam driving parts 19c, 19c due to the weight of the lamp unit 6.

The operation shaft 20 is supported by the lamp housing 2 so as to be rotatable in a shaft rotation direction. The operation shaft 20 includes a shaft part 25 and an operation part 26 that is continuous with a rear end of the shaft part 25. An axial direction of the shaft part 25 is parallel to the front-back direction. A threaded part 25a is provided at a forward offset portion of the shaft part 25.

The operation shaft 20 is inserted through the rear surface portion 2b of the lamp housing 2, and the operation part 26 thereof is located in rear of the rear surface portion 2b.

The actuator 21 is attached to the rear surface portion 2b of the lamp housing 2 at a position lateral to the operation shaft 20. The actuator 21 includes a driving part 27, a shaft part 28 and a gear part 29.

The driving part 27 is attached to a front surface of the rear surface portion 2b of the lamp housing 2.

An axial direction of the shaft part 28 is parallel to the front-back direction. Except a front portion of the shaft part 28, the shaft part is located inside the driving part 27. A front end portion of the shaft part 28 is provided as a threaded part 28a. The shaft part 28 is moved in the front-back direction by a driving force of the driving part 27. Also, the shaft part 28 is rotated, by a manual operation, in a shaft rotation direction with respect to the driving part 27.

The gear part 29 is connected to the shaft part 28. When the gear part 29 is rotated by a manual operation, the shaft part 28 is rotated in the shaft rotation direction together with the gear part 29.

A part of the actuator 21 is inserted through the rear surface portion 2b of the lamp housing 2. The gear part 29 is located in rear of the rear surface portion 2b.

A first nut member 30 is attached to the attachment hole 24a of the support plate 18. A threaded groove (not shown) is formed on an inner surface of the first nut member 30. The threaded part 25a of the operation shaft 20 is screwed to the threaded groove of the first nut member 30.

A second nut member 31 is inserted into and held in the holding hole 19a of the slider 19. The second nut member 31 is pivotable at least in the right and left direction with respect to the slider 19. A threaded groove (not shown) is formed on an inner surface of the second nut member 31. The threaded part 28a of the shaft part 28 of the actuator 21 is screwed to the threaded groove of the second nut member 31.

In the above described example, the driving part 27 of the actuator 21 is attached to the front surface of the rear surface portion 2b of the lamp housing 2, and the gear part 29 is located in rear of the rear surface portion 2b. However, the driving part 27 of the actuator 21 may be attached to a rear surface of the rear surface portion 2b of the lamp housing 2, and the driving part 27 and the gear part 29 may be located in rear of the rear surface portion 2b.

In the optical axis adjustment mechanism 16, when the operation part 26 of the operation shaft 20 is operated to rotate, the first nut member 30 is delivered and moved in the front-back direction according to the rotation direction of the operation shaft 20. As the first nut member 30 is moved in the front-back direction, the support plate 18, the holding plate 12, the slider 19, and the lamp unit 6 are integrally pivoted relative to the base body 17 in accordance with the movement of the first nut member 30 with the supported shaft 22a serving as the fulcrum. As a result, a lateral aiming adjustment corresponding to an initial adjustment of the optical axis is performed. At this time, the slider 19 is pivoted in the right-left direction relative to the second nut member 31.

Furthermore, in the optical axis adjustment mechanism 16, when the gear part 29 of the actuator 21 is operated to rotate, the second nut member 31 is delivered and moved in the front-back direction according to the rotation direction of the gear part 29 and the shaft part 28. As the second nut member 31 is moved in the front-back direction, the slider 19 is guided by the guiding protrusions 22b, 22b with respect to the support plate 18 and moved in the front-back direction in accordance with the movement of the second nut member 31. When the slider 19 is moved in the front-back direction, engagement positions where the engagement pins 19b, 19b and the cam driving parts 19c, 19c are engaged with the cam parts 15a, 15a are changed, and the holding plate 12 and the lamp unit 6 are pivoted relative to the support plate 18 with the pivot fulcrum parts 14, 14 serving as the fulcrums. As a result, a vertical aiming adjustment corresponding to the initial adjustment of the optical axis is performed.

Meanwhile, when the shaft part 28 is moved in the front-back direction by a driving force of the driving part 27 of the actuator 21, the second nut member 31 is moved in the front-back direction according to the movement direction of the shaft part 28. As the second nut member 31 is moved in the front-back direction, the holding plate 12 and the lamp unit 6 are pivoted relative to the support plate 18 with the pivot fulcrum parts 14, 14 serving as the fulcrums, as in the case of the vertical aiming adjustment. As a result, a leveling adjustment for adjusting an optical axis direction that is changed according to the weight or the like of on-vehicle objects is performed.

Second Embodiment

Next, a vehicle headlamp 1A according to a second embodiment will be described (see FIGS. 4 to 7).

The vehicle headlamp 1A according to the second embodiment is different from the above-described vehicle headlamp 1 only in the configuration of a part of the optical axis adjustment mechanism and arrangement positions of a part of the optical axis adjustment mechanism. Therefore, only the parts of the vehicle headlamp 1A which are different from those of the vehicle headlamp 1 will be described in detail. Description on the other parts thereof will be omitted by giving the same reference numerals to similar parts of the vehicle headlamp 1A to those of the vehicle headlamp 1.

Figure 4:
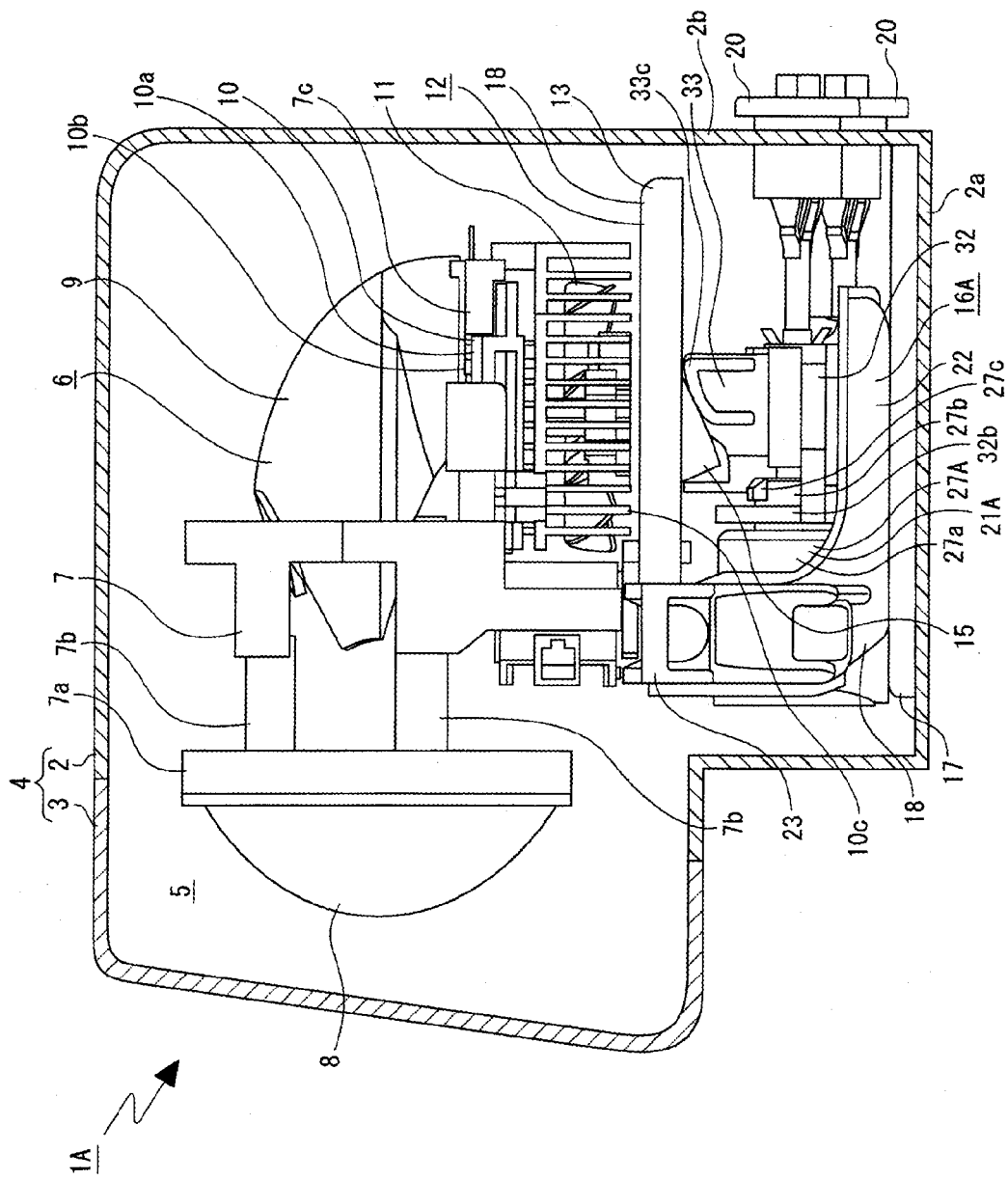
FIG. 4 is a side view of a vehicle headlamp according to a second embodiment, a part of which is drawn as a section view.
Figure 5:
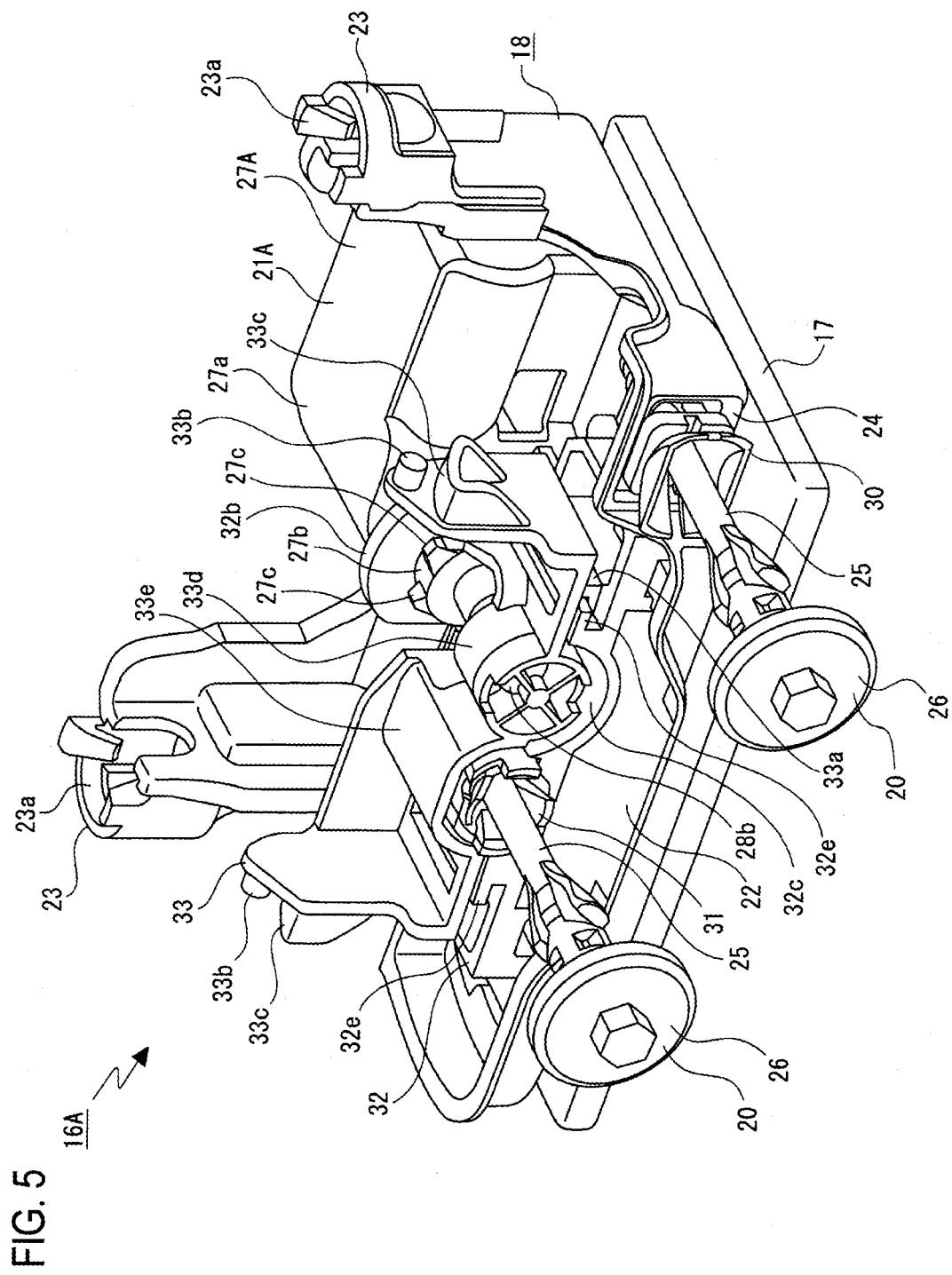
FIG. 5 is a perspective view showing an optical axis adjustment mechanism according to the second embodiment.
Figure 6:
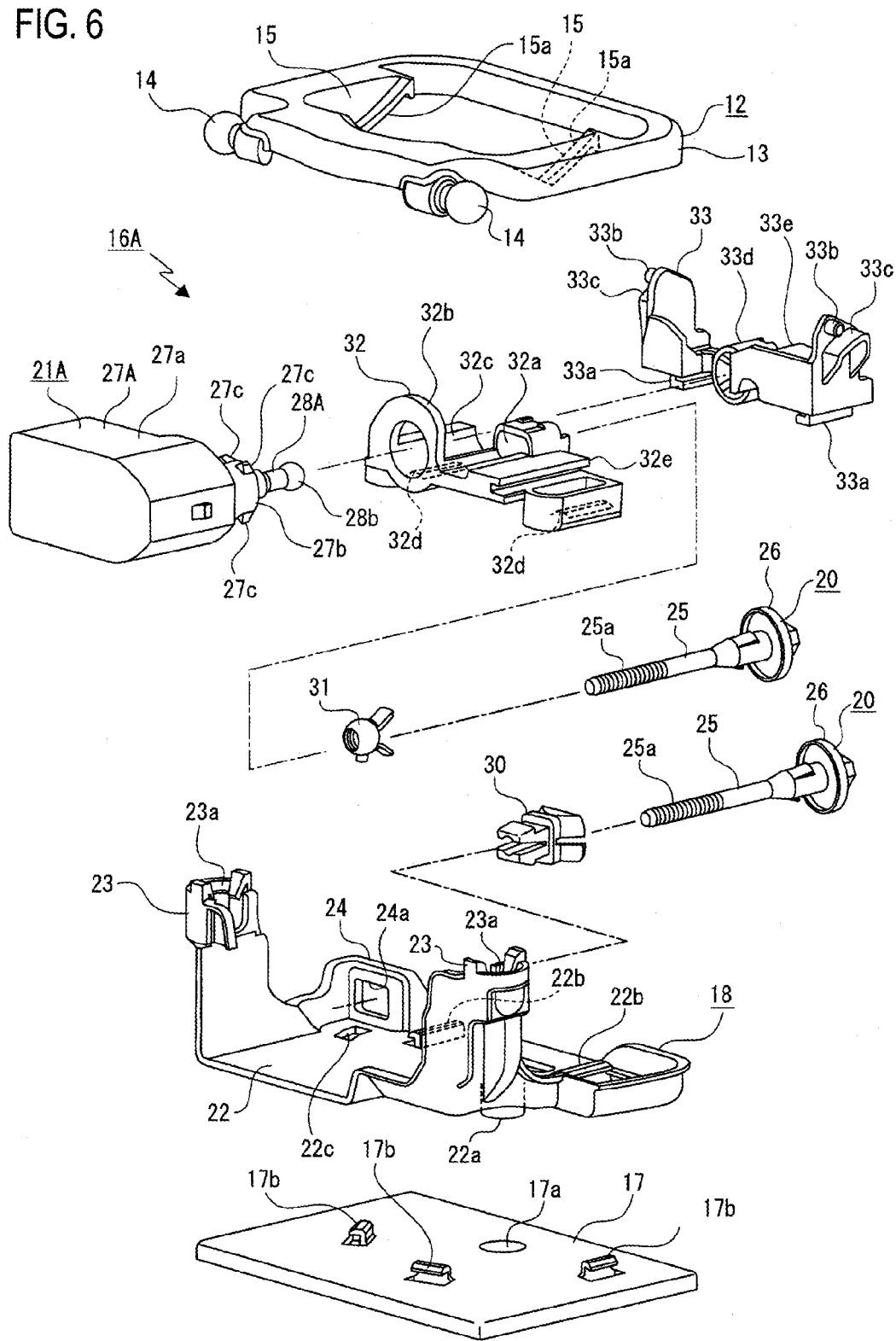
FIG. 6 is an exploded perspective view showing a holding plate and the optical axis adjustment mechanism according to the second embodiment.

An optical axis adjustment mechanism 16A is disposed below the lamp unit 6 (see FIG. 4). The optical axis adjustment mechanism 16A includes the base body 17, the support plate 18, a lower slider 32, an upper slider 33, operation shafts 20, 20, and an actuator 21A (see FIGS. 5 and 6).

The lower slider 32 has a transversely long shape. The lower slider 32 is formed, at its central rear end portion in the right-left direction, with a holding hole 32a which is penetrated in the front-back direction. The lower slider 32 is formed, at its front end portion, with a substantially ring-shaped annular insertion portion 32b which is penetrated in the front-back direction. A portion in rear of the annular insertion portion 32b is formed as a sliding recess 32 which is opened upward. The sliding recess 32c is located to be lateral to the holding hole 32a. At a lower surface of the lower slider 32, guided grooves 32d, 32d are formed. The guided grooves 32d, 32d are opened downward and extend in the front-back direction. The guided grooves 32d, 32d are spaced in the right-left direction from each other. The lower slider 32 is provided with guiding protrusions 32e, 32e which extend in the front-back direction and which are spaced in the right-left direction from each other.

The guiding protrusions 22b, 22b are respectively inserted into the guided grooves 32d, 32d. Thereby, the lower slider 32 is supported by the support plate 18 so as to be movable in the front-back direction.

The upper slider 33 has a transversely long shape. At a lower surface of the upper slider 33, guided protrusions 33a, 33a are formed. The guided protrusions 33a, 33a extend in the front-back direction and spaced in the right-left direction from each other. At both right and left side surfaces of the upper slider 33, engagement pins 33b, 33b and cam driving parts 33c, 33c are provided. The engagement pins 33b, 33b and the cam driving parts 33c, 33c project laterally (outward) from the right and left side surfaces of the upper slider 33. The engagement pins 33b, 33b and the cam driving parts 33c, 33c are spaced in the up-down direction from each other. The cam driving parts 33c, 33c are inclined upward from the front side to the rear side. At a substantially center, in the right-left direction, of the upper slider 33, a sliding coupling part 33d and a sliding plate part 33e are provided side by side in the right-left direction. An outer peripheral potion of the sliding coupling part 33d is formed in a cylindrical shape. The sliding plate part 33e has a substantially arc shape which is convex in an upward direction.

The guided protrusions 33a, 33a are slidably engaged with the guiding protrusions 32e, 32e, respectively. Thereby, the upper slider 33 is supported by the lower slider 32 so as to be slidable in the front-back direction. The cam parts 15a, 15a are respectively inserted between the engagement pins 33b, 33b and the cam driving parts 33c, 33c of the upper slider 33. Thereby, the engagement pins 33b, 33b and the cam driving parts 33c, 33c are slidable against the cam parts 15a, 15a. At this time, since the lamp unit 6 is disposed above the cam parts 15a, 15a and the cam driving parts 33c, 33c, the cam parts 15a, 15a are respectively pressed against the cam driving parts 33c, 33c due to the weight of the lamp unit 6.

The sliding coupling part 33d is inserted into the sliding recess 32c of the lower slider 32 so that the upper slider 33 slides thereagainst.

The operation shafts 20, 20 are positioned so as to be spaced in the right-left direction from each other and are inserted through the rear surface portion 2b of the lamp housing 2. The operation parts 26, 26 of the operation shafts 20, 20 are located in rear of the rear surface portion 2b.

The actuator 21A is disposed on a front side of the operation shafts 20, 20. The actuator 21A includes a driving part 27A and a shaft part 28A. The driving part 27A is disposed on an upper surface of the support plate 18 so as to be movable in the front-back direction.

The driving part 27A includes a main body 27a and an annular coupling protrusion 27b which projects rearward from the main body 27a. Restricting protrusions 27c, 27c, 27c are provided on an outer peripheral portion of the annular coupling protrusion 27b. The restricting protrusions 27c, 27c, 27c project outward. Also, the restricting protrusions 27c, 27c, 27c are spaced apart from each other in a circumferential direction.

The shaft part 28A projects rearward from the coupling protrusion 27b of the driving part 27A. A leading end portion of the shaft part 28A is provided as a spherical connection portion 28b.

The actuator 21A is configured so that the spherical connection portion 28b, the shaft part 28A, and the coupling protrusion 27b are inserted through the annular insertion part 32b of the lower slider 32 from the front side and that the spherical connection portion 28b is connected to the sliding coupling part 33d of the upper slider 33. In a state where the coupling protrusion 27b of the actuator 21A is inserted through the annular insertion part 32b, the annular insertion part 32b is positioned between a rear surface of the main body 27a of the actuator 21A and the restricting protrusions 27c, 27c, 27c while there are certain gaps between the annular insertion part 32b and the rear surface of the main body 27a and the annular insertion part 32b and the restricting protrusions 27c, 27c, 27c.

The first nut member 30 is attached to the attachment hole 24a of the support plate 18. The threaded part 25a of one of the operation shafts 20 is screwed to the threaded groove of the first nut member 30.

The second nut member 31 is inserted and held in the holding hole 32a of the lower slider 32. The threaded part 25a of the other operation shaft 20 is screwed to the threaded groove of the second nut member 31.

In the optical axis adjustment mechanism 16A, when the operation part 26 of the one of the operation shafts 20 is operated to rotate, the first nut member 30 is delivered and moved in the front-back direction according to the rotation direction of the operation shaft 20. As the first nut member 30 is moved in the front-back direction, the support plate 18, the holding plate 12, the lower slider 32, the upper slider 33, the actuator 21A, and the lamp unit 6 are integrally pivoted relative to the base body 17 with the supported shaft 22a serving as a fulcrum, in accordance with the movement of the first nut member 30. As a result, the lateral aiming adjustment corresponding to the initial adjustment of an optical axis is performed. At this time, the lower slider 32, the upper slider 33, and the actuator 21A are pivoted in the right-left direction relative to the second nut member 31.

Furthermore, in the optical axis adjustment mechanism 16A, when the operation part 26 of the other operation shaft 20 is operated to rotate, the lower slider 32 is guided by the guiding protrusions 22b, 22b and moved in the front-back direction according to the rotation direction of the operation shaft 20. As the second nut member 31 is moved in the front-back direction, the lower slider 32 is guided by the guiding protrusions 22b, 22b with respect to the support plate 18 and moved in the front-back direction in accordance with the movement of the second nut member 31. At this time, the lower slider 32 is movable relative to the upper slider 33. However, when the lower slider 32 is moved and then the annular insertion portion 32b is brought into contact with the rear surface of the main body 27a or the restricting protrusions 27c, 27c, 27c, the lower slider 32, the upper slider 33 and the actuator 21A are integrally moved in the front-back direction.

When the upper slider 32 is moved integrally with the lower slider 32 in the front-back direction, engagement positions where the engagement pins 33b, 33b and the cam driving parts 33c, 33c are engaged with the cam parts 15a, 15a are changed, and the holding plate 12 and the lamp unit 6 are pivoted relative to the support plate 18 with the pivot fulcrum parts 14, 14 serving as fulcrums. As a result, the vertical aiming adjustment corresponding to the initial adjustment of the optical axis is performed.

Meanwhile, when the shaft part 28A is moved in the front-back direction by a driving force of the driving part 27 of the actuator 21A, the upper slider 33 is moved in the front-back direction according to the movement direction of the shaft part 28A. At this time, the upper slider 33 is movable relative to the lower slider 33. However, when the upper slider 33 is moved and then a portion of the actuator 21A or the upper slider 33 is brought into contact with a portion of the lower slider 32, the lower slider 32 and the upper slider 33 are integrally moved in the front-back direction.

As the upper slider 33 is moved integrally with the lower slider 32 in the front-back direction, the holding plate 12 and the lamp unit 6 are pivoted relative to the support plate 18 with the pivot fulcrum parts 14, 14 serving as the fulcrum, as in the case of the vertical aiming adjustment. As a result, the leveling adjustment for adjusting the optical axis direction, which is changed according to the weight or the like of on-vehicle objects is performed.

Figure 7:
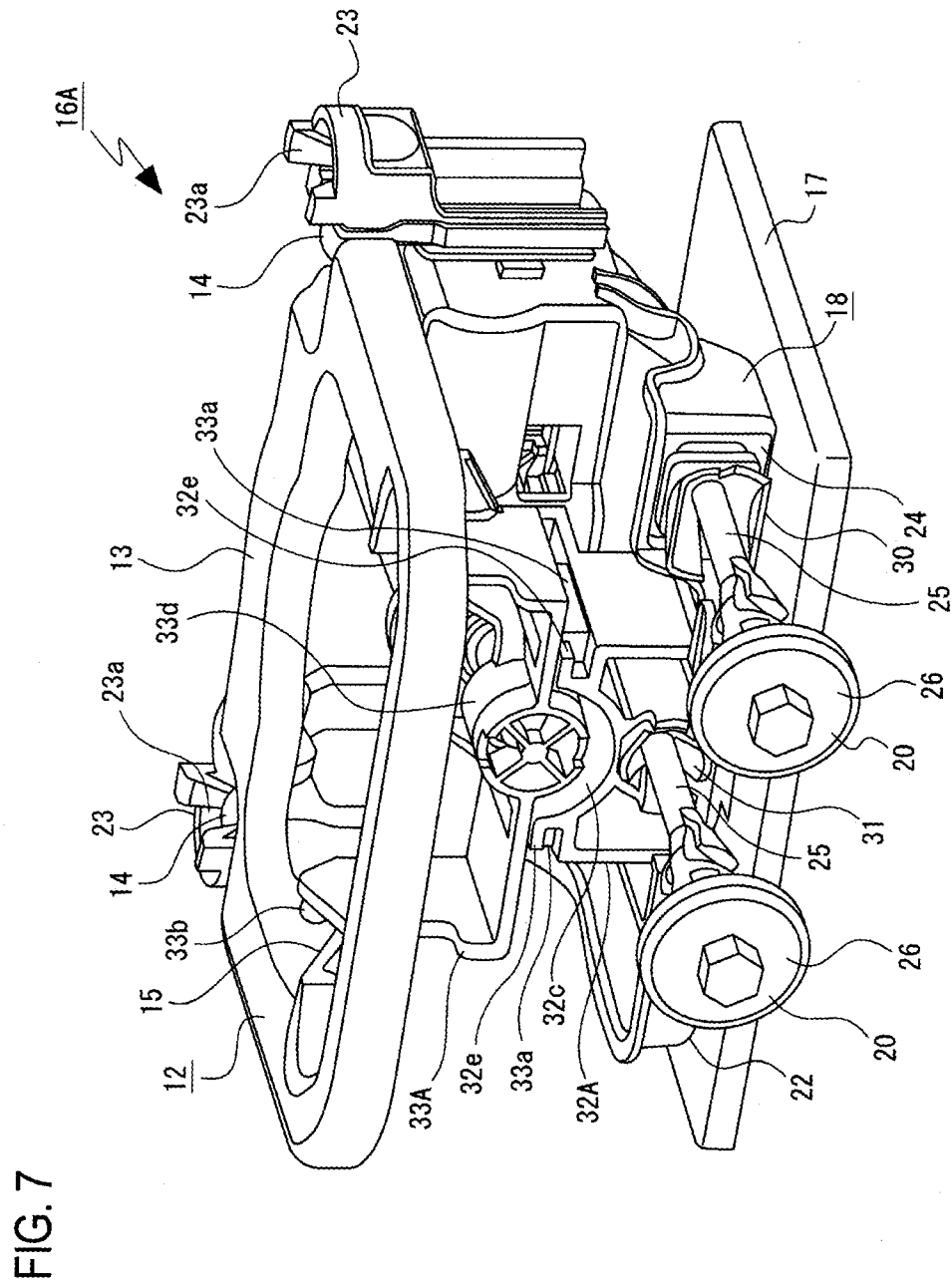
FIG. 7 is a perspective view showing a holding plate and a optical axis adjustment mechanism according to another example of the second embodiment.

In addition, in the above-described vehicle headlamp 1A according to the second embodiment, it is possible to achieve size reduction in the right-left direction by providing a lower slider 32A and an upper slider 33A that are respectively obtained by changing the shape or size of the lower slider 32 and the upper slider 33 in the following manner (see FIG. 7).

The lower slider 32A is formed with the holding hole 32a at a central portion, in the right-left direction, of a rear end portion thereof. The holding hole 32a is penetrated in the front-back direction. The lower slider 32A is provided, at its front end portion, with the substantially ring-shaped annular insertion portion 32b which is penetrated in the front-back direction. A rear portion of the annular insertion portion 32b is formed as the sliding recess 32 which is opened upward. The sliding recess 32c is located above the holding hole 32a. The guided grooves 32d, 32d are formed at the lower surface of the lower slider 32A. The guided grooves 32d, 32d are opened downward and extend in the front-back direction. The guided grooves 32d, 32d are spaced in the right-left direction from each other. The lower slider 32A is provided, at its upper surface, with the guiding protrusions 32e, 32e. The guiding protrusions 32e, 32e extend in the front-back direction and are spaced in the right-left direction from each other.

The guided protrusions 33a, 33a are formed at the lower surface of the upper slider 33A. The guided protrusions 33a, 33a extend in the front-back direction. The guided protrusions 33a, 33a are spaced in the right-left direction from each other. The engagement pins 33b, 33b and the cam driving parts 33c, 33c are provided at the both right and left side surfaces of the upper slider 33A. The engagement pins 33b, 33b and the cam driving parts 33c, 33c are spaced in the up-down direction from each other. The engagement pins 33b, 33b and the cam driving parts 33c, 33c respectively project laterally (outward) from the right and left side surfaces of the upper slider 33A. The cam driving parts 33c, 33c are inclined upward from the front side to the rear side. The sliding coupling part 33d is provided at the substantially center, in the right-left direction, of the upper slider 33A. An outer peripheral portion of the sliding coupling part 33d is formed in a cylindrical shape.

The sliding coupling part 33d is inserted into the sliding recess 32c of the lower slider 32A so that the upper slider 33A is slidable.

With this configuration, the sliding coupling part 33d of the upper slider 33A sliding against the sliding recess 32c is located above the holding hole 32a. Therefore, it is possible to achieve the size reduction in the right-left direction.

Third Embodiment

Next, a vehicle headlamp 1B according to a third embodiment will be described (see FIGS. 8 and 9).

The vehicle headlamp 1B according to the third embodiment is different from the above-described vehicle headlamp 1 only in the configuration of the holding plate, the configuration of a part of the optical axis adjustment mechanism, and arrangement positions of a part of the optical axis adjustment mechanism. Accordingly, only the parts of the vehicle headlamp 1B different from those of the vehicle headlamp 1 will be described in detail, and description on the other parts thereof will be omitted by giving the same reference numerals to similar parts of the vehicle headlamp 1B to those of the vehicle headlamp 1.

Figure 8:
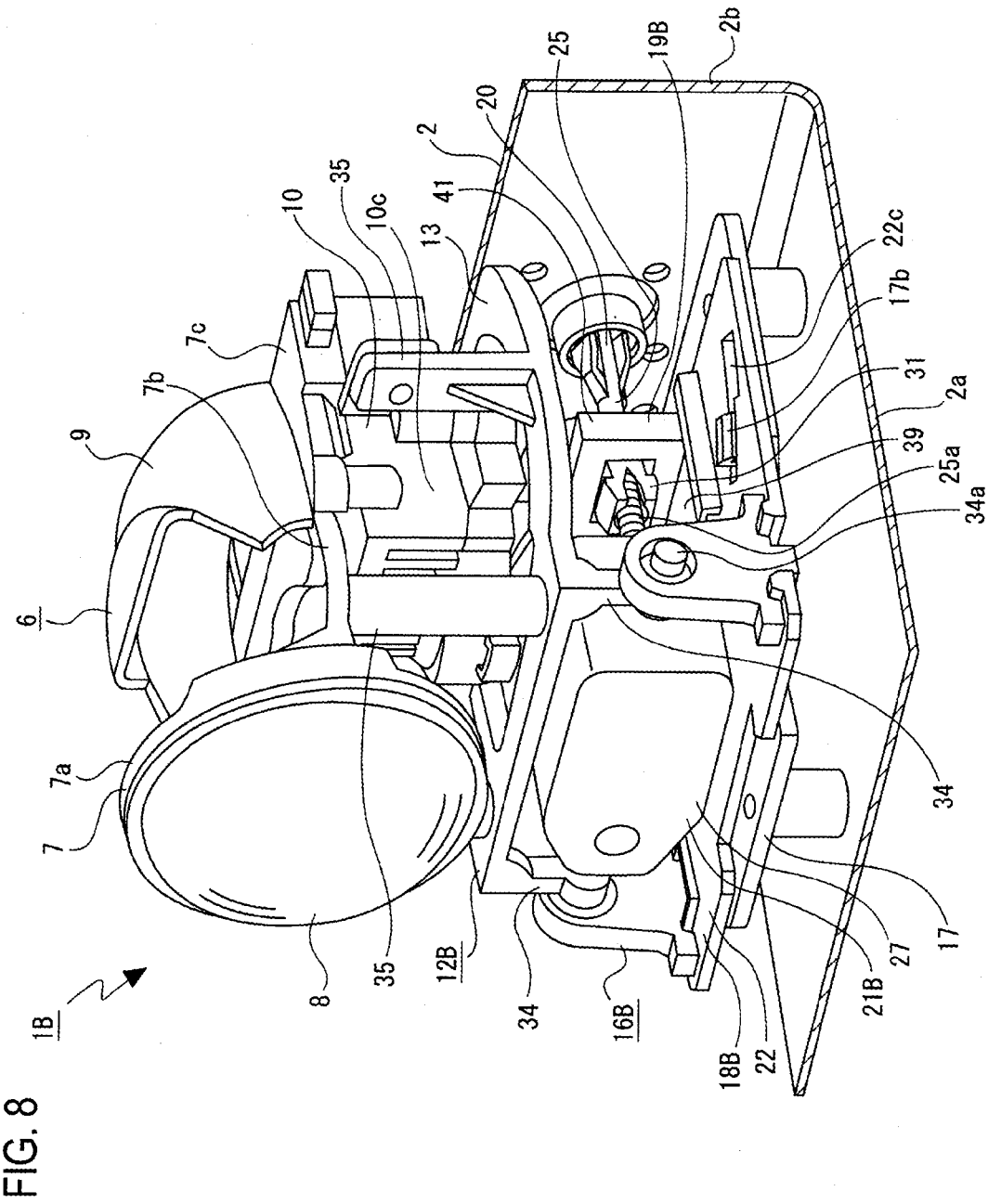
FIG. 8 is a perspective view showing a vehicle headlamp according to a third embodiment.
Figure 9:
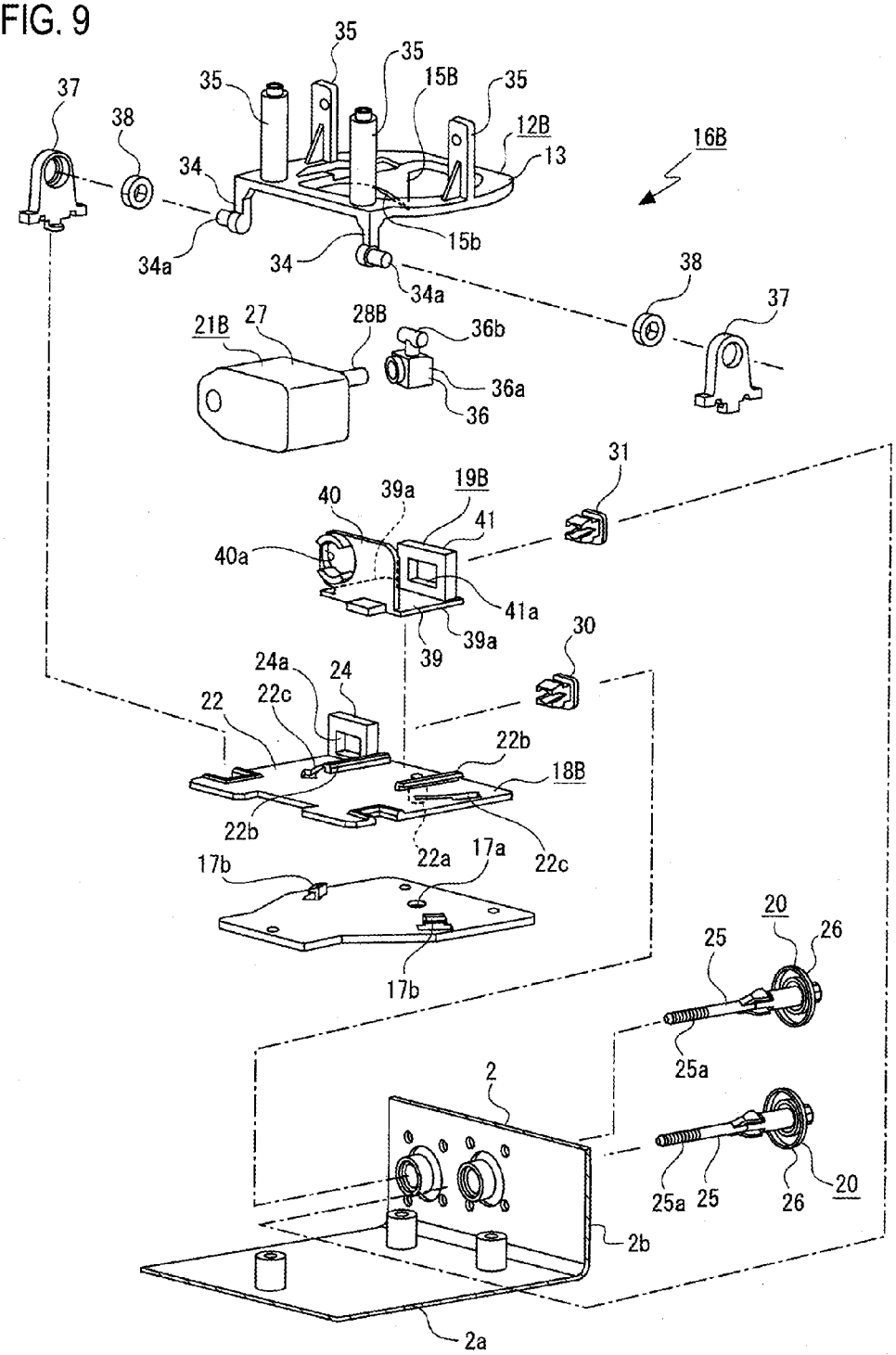
FIG. 9 is an exploded perspective view showing a holding plate and an optical axis adjustment mechanism according to the third embodiment.

The lamp unit 6 is attached to a holding plate 12B located on a lower side thereof and held (see FIG. 8). The holding plate 12B includes a substantially rectangular frame-shaped holding part 13, supported parts 34, 34, a sliding engagement part 15B, and attachment leg parts 35, 35. The holding part 13 is penetrated in the up-down direction. The supported parts 34, 34 respectively project downward from both right and left end portions in a front end portion of the holding part 13. The attachment leg parts 35, 35, . . . project upward from the holding part 13. In the holding plate 12B, the holding part 13, the supported parts 34, 34, the sliding engagement part 15B, and the attachment leg parts 35, 35, . . . are integrally formed. Respective parts of the lamp unit 6 are attached to the attachment leg parts 35, 35, . . . by screws or the like so that the lamp unit 6 is held in the holding plate 12B.

The supported parts 34, 34 are provided, at its lower end portions, with pivot fulcrum parts 34a, 34a that respectively project laterally (outward).

The sliding engagement part 15B projects downward from an inner edge of one of side portions of the holding part 13. A lower surface of the sliding engagement part 15B is formed as a cam part 15b. The cam part 15b is inclined downward from the front side to the rear side.

An optical axis adjustment mechanism 16B is disposed below the lamp unit 6. The optical axis adjustment mechanism 16B includes the base body 17, a support plate 18B, a slider 19B, a cam member 36, the operation shafts 20, 20, and an actuator 21B.

The support plate 18B includes the base surface part 22 and the nut attachment part 24. Bearing members 37, 37 are respectively mounted to both right and left side portions of the base surface part 22 of the support plate 18B. Bearing rings 38, 38 are respectively supported on the upper ends of the bearing members 37, 37. In addition, the bearing members 37, 37 may be formed integrally with the lamp housing 2.

The support plate 18B is pivotably supported by the base body 17 with the supported shaft 22a serving as a fulcrum.

The pivot fulcrum parts 34a, 34a of the holding plate 12B are respectively inserted to the bearing rings 38, 38 supported by the bearing members 37, 37, and the holding plate 12B is pivotably supported by the support plate 18B with the pivot fulcrum parts 34a, 34a serving as fulcrums.

The slider 19B includes a slide surface part 39 which is oriented in the up-down direction, an actuator fixing portion 40 which projects upward from a front end portion of the slide surface part 39, and a nut attachment part 41 which projects upward from a rear end portion of the slide surface part 39. Both right and left end portions of the slide surface part 39 are provided as guided parts 39a, 39a. The actuator fixing part 40 is formed with a shaft insertion hole 40a which is penetrated in the front-back direction. The nut attachment part 41 is formed with an attachment hole 41a which is penetrated in the front-back direction.

The guided parts 39a, 39a are slidably engaged with the guiding protrusions 22b, 22b, respectively. Thereby, the slider 19B is supported by the support plate 18B so as to be movable in the front-back direction.

The cam member 36 includes a connection part 36a and a cam driving part 36b which projects upward from the connection part 36a. The cam driving part 36b has a columnar shape whose axial direction corresponds to the right-left direction.

The actuator 21B is disposed on the front side of the operation shafts 20, 20. The actuator 21B includes the driving part 27 and a shaft part 28B. The driving part 27 is disposed on an upper surface of the support plate 18B so as to be movable in the front-back direction.

The connection part 36a of the cam member 36 is connected to the shaft part 28B of the actuator 21B. Therefore, the cam member 36 is moved in the front-back direction in accordance with the movement of the shaft part 28B. In the actuator 21B, the shaft part 28B is inserted through the shaft insertion hole 40a formed on the actuator fixing part 40 of the slider 19B, and the driving part 27 is fixed to the actuator fixing part 40.

The cam member 36 is configured so that the cam driving part 36b is slidably engaged with the cam part 15b of the holding plate 12 from below. At this time, since the lamp unit 6 is disposed above the cam part 15b and the cam driving part 36b, the cam part 15b is pressed against the cam driving part 36b due to the weight of the lamp unit 6.

The first nut member 30 is attached to the attachment hole 24a of the support plate 18B. The second nut member 31 is attached to the attachment hole 41a of the slider 19B.

In the optical axis adjustment mechanism 16B, when the operation part 26 of one of the operation shafts 20 is operated to rotate, the first nut member 30 is delivered and moved in the front-back direction according to the rotation direction of the operation shaft 20. As the first nut member 30 is moved in the front-back direction, the support plate 18B, the holding plate 12B, the slider 19B, the cam member 36, the bearing members 37, 37, the actuator 21B, and the lamp unit 6 are integrally pivoted relative to the base body 17 with the supported shaft 22a serving as the fulcrum, in accordance with the movement of the first nut member 30. As a result, the lateral aiming adjustment corresponding to the initial adjustment of the optical axis is performed. At this time, the slider 19B is pivoted in the right-left direction relative to the second nut member 31.

Furthermore, in the optical axis adjustment mechanism 16B, when the operation part 26 of the other operation shaft 20 is operated to rotate, the second nut member 31 is delivered and moved in the front-back direction according to the rotation direction of the operation shaft 20. As the second nut member 31 is moved in the front-back direction, the slider 19B, the actuator 21B, and the cam member 36 are guided by the guiding protrusions 22b, 22b with respect to the support plate 18B and moved in the front-back direction. As the slider 19B, the actuator 21B, and the cam member 36 are moved in the front-back direction, a position where the cam driving part 36b of the cam member 36 is engaged with the cam part 15b is changed, and the holding plate 12B and the lamp unit 6 are pivoted relative to the support plate 18B with the pivot fulcrum parts 34a, 34a serving as fulcrums. As a result, the vertical aiming adjustment corresponding to the initial adjustment of the optical axis is performed.

Meanwhile, when the shaft part 28B is moved in the front-back direction by a driving force of the driving part 27 of the actuator 21B, the cam member 36 is moved in the front-back direction according to the movement direction of the shaft part 28B. As the cam member 36 is moved in the front-back direction, the holding plate 12B and the lamp unit 6 are pivoted relative to the support plate 18B with the pivot fulcrum parts 34a, 34a serving as the fulcrum, as in the case of the vertical aiming adjustment. As a result, the leveling adjustment for adjusting the optical axis direction that is changed according to the weight or the like of on-vehicle objects is performed.

Fourth Embodiment

Figure 10:
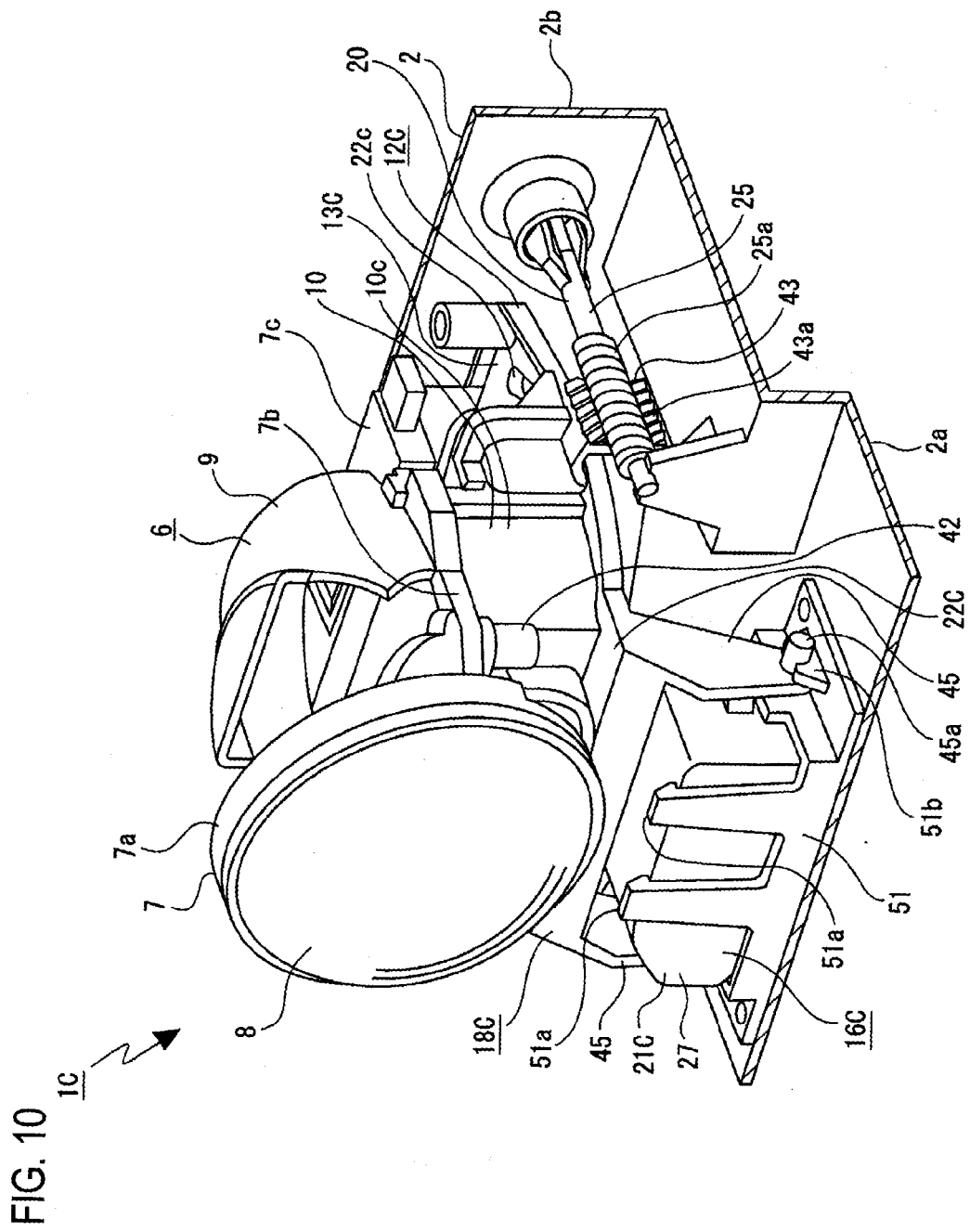
FIG. 10 is a perspective view showing a vehicle headlamp according to a fourth embodiment.
Figure 11:
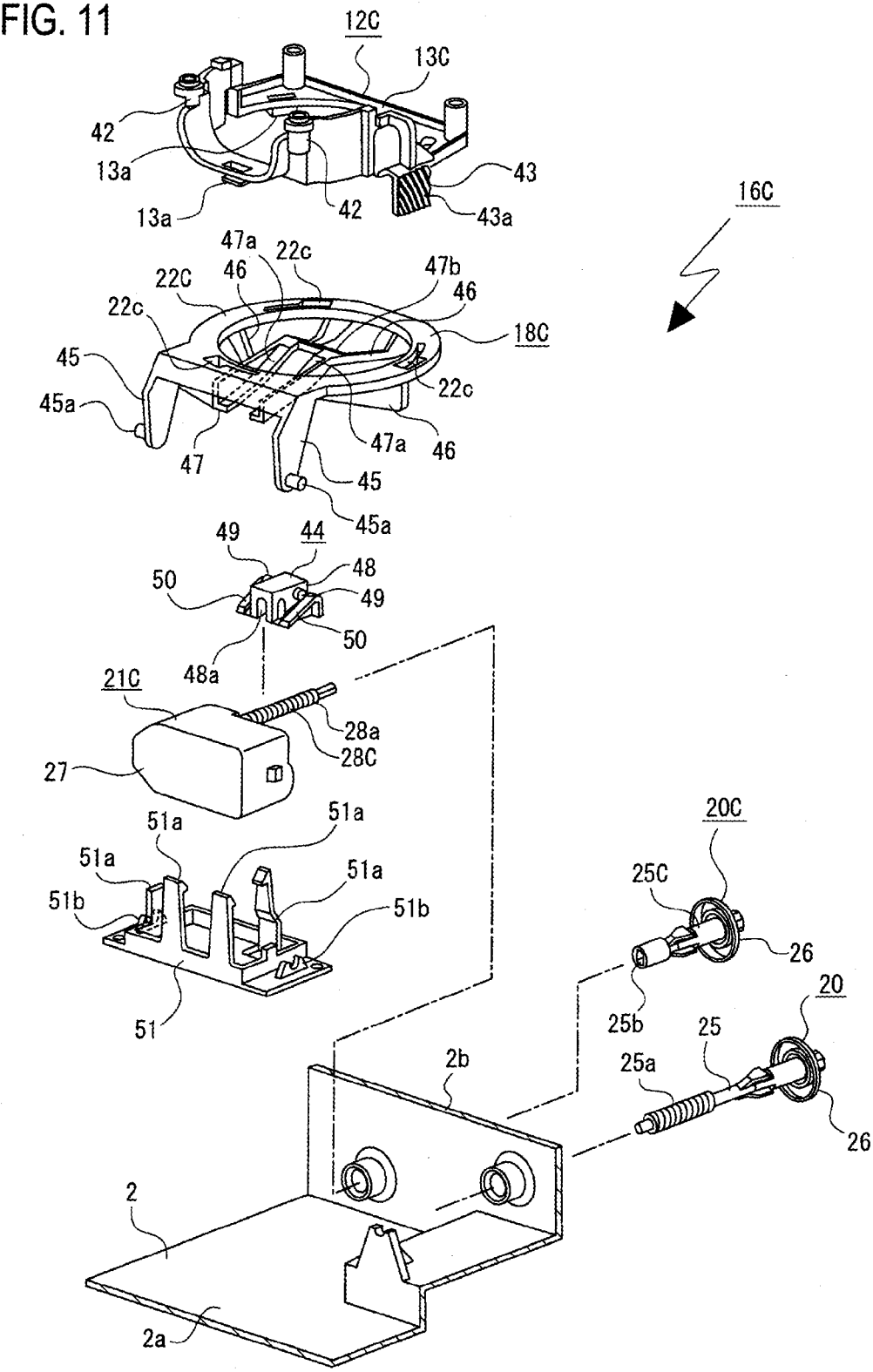
FIG. 11 is an exploded perspective view showing a holding plate and an optical axis adjustment mechanism according to the fourth embodiment.

Next, a vehicle headlamp 1C according to a fourth embodiment will be described (see FIGS. 10 to 11).

Meanwhile, the vehicle headlamp 1C according to the fourth embodiment is different from the above-described vehicle headlamp 1 only in the configuration of the holding plate, the configuration of a part of the optical axis adjustment mechanism and arrangement positions of a part of the optical axis adjustment mechanism. Accordingly, only the parts of the vehicle headlamp 1C different from those of the vehicle headlamp 1 will be described in detail, and description on the other parts thereof will be omitted by giving the same reference numerals to similar parts of the vehicle headlamp 1C to those of the vehicle headlamp 1.

The lamp unit 6 is attached to a holding plate 12C located on a lower side thereof and is held. The holding plate 12C includes a substantially rectangular frame-shaped holding part 13C which is penetrated in the up-down direction, attachment leg parts 42, 42 which respectively project upward from the holding part 13C, and a connecting surface part 43 which projects downward from one of side portions of the holding part 13C.

Supporting ridges 13*a*, 13*a*, 13*a* are provided at a lower surface of the holding part 13C. The supporting ridges 13*a*, 13*a*, 13*a* project downward and are spaced from each other in a circumferential direction.

The connecting surface part 43 has a plate shape which is oriented in a substantially right-left direction. An outer surface of the connecting surface part 43 is formed in a smoothly arc-surface shape which is convex outward. A gear part 43*a* is provided on the outer surface of the connecting surface part 43.

An optical axis adjustment mechanism 16C is disposed below the lamp unit 6. The optical axis adjustment mechanism 16C includes a support plate 18C, a cam member 44, operation shafts 20, 20*c*, and an actuator 21C. Also, the connecting surface part 43 of the holding plate 12C is also included in the optical axis adjustment mechanism 16C.

The support plate 18C includes a substantially ring-shaped base surface part 22C, supported parts 45, 45, connection leg parts 46, 46, . . . , and a sliding engagement part 47. The base surface part 22C is penetrated in the up-down direction. The supported parts 45, 45 respectively project downward from both right and left end portions in a front end portion of the base surface part 22C. The connection leg parts 46, 46, . . . project inwardly and obliquely downward from the base surface part 22C. The sliding engagement part 47 is connected to the connection leg parts 46, 46, . . . .

In the base surface part 22C, arc-shaped supported holes 22*c*, 22*c*, 22*c* are formed so as to be spaced from each other in a circumferential direction.

At a lower end portion of the supported parts 45, 45, pivot fulcrum parts 45*a*, 45*a* which respectively project laterally (outward) are provided.

The sliding engagement part 47 includes cam parts 47*a*, 47*a* and a connecting side part 47*b*. The cam parts 47*a*, 47*a* extend in the front-back direction and are spaced from each other in the right-left direction. The connecting side part 47*b* connects rear end portion of the cam parts 47*a*, 47*a* to each other. The cam parts 47*a*, 47*a* are inclined upward from the front side to the rear side.

The supporting ridges 13*a*, 13*a*, 13*a* of the holding plate 12C are slidably engaged with the supported holes 22*c*, 22*c*, 22*c* of the support plate 18C, respectively. Therefore, the holding plate 12C is pivotably supported by the support plate 18C.

The cam member 44 includes a block-shaped coupling part 48, engagement pins 49, 49, and cam driving parts 50, 50. The engagement pins 49, 49 and the cam driving parts 50, 50 respectively project laterally (outward) from both right and left side surfaces of the coupling part 48. The coupling part 48 is formed with a screwing recess 48*a* which is opened downward. A screwed groove (not shown) is formed at a peripheral surface of the screwing recess 48*a*. The cam driving parts 50, 50 are inclined upward form the front side to the rear side.

The cam parts 47*a*, 47*a* of the support plate 18C are inserted between the engagement pins 49, 49 and the cam driving parts 50, 50 of the cam member 44, and the engagement pins 49, 49 and the cam driving parts 50, 50 are slidable against the cam parts 47*a*, 47*a*. At this time, since the lamp unit 6 is disposed above the cam parts 47*a*, 47*a* and the cam driving parts 50, 50, the cam parts 47*a*, 47*a* are respectively pressed against the cam driving parts 50, 50 due to the weight of the lamp unit 6.

In the operation shaft 20, the threaded part 25*a* formed on the shaft part 25 is screwed to the gear part 43*a* formed on the connecting surface part 43 of the holding plate 12C.

The operation shaft 20C is shorter than the operation shaft 20. Also, a threaded part is not formed in the operation shaft 25*c*. A non-circular coupling hole 25*b* which is opened forward is formed in the shaft part 25C. The operation shaft 20C is spaced in the right-left direction from the operation shaft 20 and is supported by the lamp housing 2 so as to be rotatable in an axial direction.

The actuator 21C is disposed in front of the operation shafts 20, 20C. The actuator 21C includes the driving part 27 and a shaft part 28C. The shaft part 28C is formed with the threaded part 28*a*.

The shaft part 28C of the actuator 21C is inserted into the coupling hole 25*b* of the shaft part 25C and is coupled to the operation shaft 20C. Therefore, the operation shaft 20C and the shaft part 28C of the actuator 21C are integrally rotated.

The threaded part 28*a* formed on the shaft part 28C of the actuator 21C is inserted and screwed to the screwing recess 48*a* of the cam member 44.

The actuator 21C is attached to an attachment bracket 51 fixed to the bottom surface 2*a* of the lamp housing 2. The attachment bracket 51 includes attachment protrusions 51*a*, 51*a* and bearing parts 51*b*, 51*b*. The attachment protrusions 51*a*, 51*a*, . . . is used to attach the actuator 21C. The bearing parts 51*b*, 51*b* are provided on the right and left sides of the attachment protrusions 51*a*, 51*a*, . . . . Here, the attachment bracket 51 may be provided integrally with the lamp housing 2.

The pivot fulcrum parts 45*a*, 45*a* of the holding plate 12C are supported by the bearing parts 51*b*, 51*b* of the attachment bracket 51. Therefore, the holding plate 12C is pivotably supported by the attachment bracket 51 with the pivot fulcrum parts 45*a*, 45*a* serving as fulcrums.

In the optical axis adjustment mechanism 16C, when the operation part 26 of the operation shaft 20 is operated to rotate, the holding plate 12C and the lamp unit 6 are integrally pivoted with respect to the support plate 18C according to the rotation direction of the operation shaft 20. As a result, the lateral aiming adjustment corresponding to the initial adjustment of the optical axis is performed.

Furthermore, in the optical axis adjustment mechanism 16C, when the operation part 26 of the operation shaft 20C is operated to rotate, the shaft part 28C of the actuator 21C is rotated in accordance with the rotation of the operation shaft 20C. Then, the cam member 44 is delivered and moved in the front-back direction in accordance with the rotation of the shaft part 28C. As the cam member 44 is moved in the front-back direction, positions where the engagement pins 49, 49 and the cam driving parts 50, 50 are engaged with the cam parts 47*a*, 47*a* are changed, and the holding plate 12C and the lamp unit 6 are pivoted relative to the attachment bracket 51 with the pivot fulcrum parts 45*a*, 45*a* serving as fulcrums. As a result, the vertical aiming adjustment corresponding to the initial adjustment of the optical axis is performed.

Meanwhile, when the shaft part 28C is moved in the front-back direction by a driving force of the driving part 27 of the actuator 21C, the cam member 44 is moved in the front-back longitudinal direction according to the movement direction of the shaft part 28C. As the cam member 44 is moved in the front-back direction, the holding plate 12C and the lamp unit 6 are pivoted relative to the support plate 18C with the pivot fulcrum parts 45*a*, 45*a* serving as the fulcrums, as in the case of the vertical aiming adjustment. As a result, the leveling adjustment for adjusting the optical axis direction that is changed according to the weight or the like of on-vehicle objects is performed.

Modification Example 1

Figure 12:
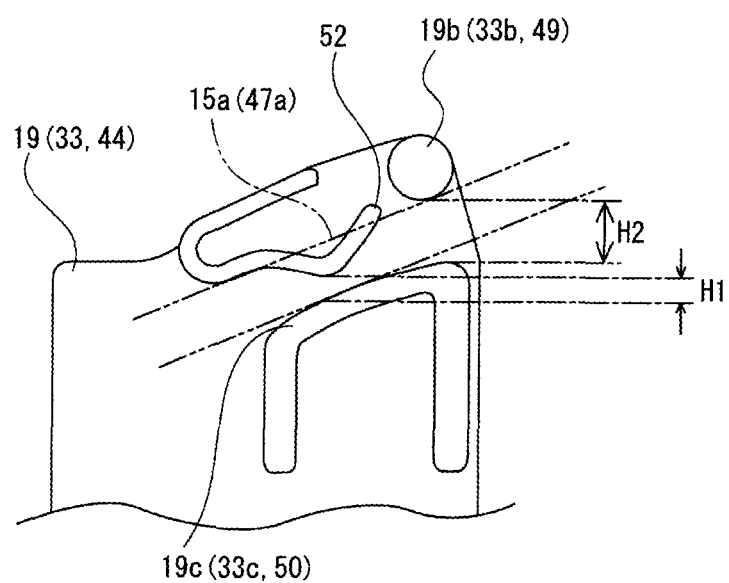
FIG. 12 is an enlarged side view showing a structure provided with a biasing part.

Hereinafter, an example of the configuration for securely sliding the cam part and the cam driving part relative to each other will be described (see FIG. 12).

The example described in the following description may be applied to any one of the sliding structure between the cam part 15a and the cam driving part 19c in the first embodiment, the sliding structure between the cam part 15a and the cam driving part 19c in the second embodiment, the sliding structure between the cam part 15b and the cam driving part 36b in the third embodiment, and the sliding structure between the cam part 47a and the cam driving part 50 in the fourth embodiment.

In the following description, the configuration for securely sliding the cam part 15a of the holding plate 12 and the cam driving part 19c of the slider 19 relative to each other will be described, as an example.

Biasing parts 52, 52 are respectively provided above the cam driving parts 19c, 19c of the slider 19. For example, a leaf spring is used as the biasing part 52. The biasing part 52 is positioned in front of the engaging pin 19b, for example.

In a state where the biasing part 52 is not elastically deformed, a distance H1 between the biasing part 52 and the cam driving part 19c is smaller than a distance H2 between the engaging pin 19b and the cam driving part 19c. Therefore, the cam part 15a inserted between the engaging pin 19b and the cam driving part 19c is pressed against the cam driving part 19c by the biasing part 52. As a result, the cam part 15a and the cam driving part 19c reliably slide against each other.

By providing the biasing part 52 in this way, the cam part 15a is pressed against the cam driving part 19c by the biasing part 52. Thereby, the cam part 15a and the cam driving part 19c reliably slide against each other without rattling. For this reason, it is possible to prevent displacement of the optical axis due to vibration or the like. In addition, collision between the cam part 15a and the cam driving part 19c due to the vibration or the like does not occur. Therefore, it is possible to prevent damages or the like of both of the cam part 15a and the cam driving part 19c.

Modification 2

In a certain vehicle headlamp, a lamp unit including a light source or the like is disposed inside a lamp outer case formed of a cover and a lamp housing, for example.

In a vehicle headlamp described in JP 2011-150993 A (corresponding to EP 2 338 728 A1), an optical axis adjustment mechanism such as an aiming mechanism for performing an initial adjustment of an optical axis direction and a leveling mechanism for adjusting the optical axis direction according to the weight of on-vehicle objects is disposed.

The vehicle headlamp described in JP 2011-150993 A is provided with the aiming mechanism and the leveling mechanism. The aiming mechanism includes a pivot shaft serving as a pivot fulcrum and two rotatable operation shafts (aiming shafts) for performing the optical axis adjustment in the up-down direction and the right-left direction. The leveling mechanism includes a leveling actuator provided with a leveling shaft that is movable in an axial direction. Both the pivot shaft and the two aiming shafts are connected to a frame for supporting the lamp unit. The leveling shaft is connected to the lamp unit.

When one of the aiming shafts is rotated, the frame and the lamp unit are integrally pivoted while using, as a fulcrum, a line connecting the pivot shaft and the other of the aiming shafts. Therefore, the optical axis adjustment (aiming adjustment) in the front-back direction or in the right-left direction is performed. Also, when the leveling shaft is moved in the axial direction (front-back direction) by an operation of the leveling actuator, the lamp unit is pivoted with respect to the frame and, in this way, an optical axis adjustment (leveling adjustment) is performed.

However, in the vehicle headlamp described in JP 2011-150993 A, both the pivot shaft and the aiming shafts are connected to the frame, which is a single component. Accordingly, a degree of freedom of structural design is low, and arrangement space of each part is likely to be limited. As a result, it may be difficult to achieve size reduction.

Then, the vehicle headlamp may be configured as follows so as to improve a degree of freedom of design and to achieve the size reduction of the vehicle headlamp.

(A) A vehicle headlamp includes a lamp outer case, a holding plate, a lamp unit, and an optical axis adjustment mechanism. The lamp outer case includes a lamp housing and a cover. The lamp housing is formed with an opening on at least one side thereof. The cover covers the opening of the lamp housing. The holding plate is pivotable in at least one of an up-down direction and a right-left direction. The lamp unit is attached to the holding plate and includes a light source. The optical axis adjustment mechanism adjusts an optical axis direction of the lamp unit. The optical axis adjustment mechanism includes a cam part and a cam driving part that is slidably engaged with the cam part and that pivots the lamp unit in the up-down direction or the right-left direction.

(A') A vehicle headlamp includes a lamp outer case, a holding plate, a lamp unit, and an optical axis adjustment mechanism. The lamp outer case includes a lamp housing and a cover. The lamp housing is formed with an opening on at least one side thereof. The cover covers the opening of the lamp housing. The holding plate is pivotable in at least one of an up-down direction and a right-left direction. The lamp unit is attached to the holding plate and includes a light source. The optical axis adjustment mechanism adjusts an optical axis direction of the lamp unit. The holding plate includes a cam part. The optical axis adjustment mechanism includes a cam driving part that is slidably engaged with the cam part and that pivots the lamp unit in the up-down direction or the right-left direction.

With the vehicle headlamps of (A) and (A'), a cam mechanism is used as a mechanism for pivoting the lamp unit. Therefore, a degree of freedom of structural design is high, and limitation in the arrangement space of each part is less likely to occur. Therefore, it is possible to reduce the size of the vehicle headlamps owing to improvement in a degree of freedom of design.

(B) The vehicle headlamp of any one of (A) and (A') may further include a support plate that supports the holding plate so as to be pivotable in one of the up-down direction and the right-left direction and that is pivotable in the other of the up-down direction and the right-left direction with respect to the lamp housing. When the holding plate is pivoted in the one of the up-down direction and the right-left direction, the optical axis direction may be adjusted in the up-down direction or the right-left direction by the optical axis adjustment mechanism. When the support plate and the holding plate are integrally pivoted in the other of the up-down direction and the right-left direction, the optical axis direction may be adjusted in the up-down direction or the right-left direction by the optical axis adjustment mechanism.

With the vehicle headlamp of (B), a pivot shaft for the up-down direction and a pivot shaft for the right-left direction are provided in different members. For this reason, twisting moment is less likely to occur at the time of pivoting in the up-down direction and the right-left direction. Therefore, it is possible to ensure a smooth operation.

(C) In the vehicle headlamp of any one of (A), (A'), and (B), the lamp unit may be disposed above the cam part and the cam driving part. The cam part may be pressed against the cam driving part due to a weight of the lamp unit.

With the vehicle headlamp of (C), it is possible to improve reliability in a pivot operation of the lamp unit while ensuring a size reduction in the front-back direction.

(D) In the vehicle headlamp of any one of (A), (A'), (B) and (C), the holding plate may include a holding part to which the lamp unit is attached. The holding part may have a frame shape which is penetrated in the up-down direction.

With the vehicle headlamp of (D), it is possible to reduce the weight of the vehicle headlamp while ensuring high rigidity of the holding plate.

(E) The vehicle headlamp of any one of (A), (A'), (B), (C), and (D) may further include a biasing part that presses the cam part against the cam driving part.

With the vehicle headlamp of (E), the cam part is pressed against the cam driving part by the biasing part. Therefore, both the cam part and the cam driving part surely slide against each other without rattling. For this reason, it is possible to prevent displacement of the optical axis due to vibration or the like. Furthermore, the collision between the cam part and the cam driving part due to the vibration or the like does not occur. Therefore, it is possible to prevent damages or the like of both of the cam part and the cam driving part.

As described above, in the vehicle headlamps 1, 1A, 1B, 1C, the optical axis adjustment mechanisms 16, 16A, 16B, 16C for adjusting the optical axis direction are disposed below the lamp unit 6.

Therefore, since the lamp unit 6 and the optical axis adjustment mechanisms 16, 16A, 16B, 16C are arranged one above the other, it is possible to reduce the size thereof in the front-back direction.

Furthermore, the holding plates 12, 12B, 12C are pivoted in the up-down direction, the support plates 18, 18B, 18C and the holding plates 12, 12B, 12C are integrally pivoted in the right-left direction, and a pivot shaft for the front-back direction and a pivot shaft for the right-left direction are provided in different members. Therefore, twisting moment is less likely to occur at the time of pivoting in the up-down direction and pivoting in the right-left direction. As a result, it is possible to ensure a smooth operation.

In addition, the examples where the holding plates 12, 12B, 12C are pivoted in the up-down direction and the support plates 18, 18B, 18C and the holding plates 12, 12B, 12C are integrally pivoted in the right-left direction has been described in the foregoing description. To the contrary, the holding plates 12, 12B, 12C may be pivoted in the right-left direction, and the support plates 18, 18B, 18C and the holding plates 12, 12B, 12C may be integrally pivoted in the up-down direction.

Furthermore, since the holding plates 12, 12B, 12C and the support plates 18, 18B, 18C are arranged one above the other, it is possible to further reduce the size thereof in the front-back direction, correspondingly.

Furthermore, the holding plates 12, 12B, 12C are provided with the frame-shaped holding parts 13, 13C, which are penetrated in the up-down direction. Therefore, it is possible to reduce the weight of the vehicle headlamps 1, 1A, 1B, 1C while ensuring high rigidity of the holding plates 12, 12B.

Additionally, the holding plates 12, 12B, 12C are integrally provided with the pivot fulcrum parts 14, 34a, 45a for the up-down direction, and the support plates 18, 18B are integrally provided with the supported shaft 22a serving as a pivot fulcrum for the right-left direction. Therefore, it is possible to achieve decrease in the manufacturing cost owing to reduction in the number of parts.

Furthermore, in the vehicle headlamps 1, 1A, 1B, 1C, the optical axis adjustment mechanisms 16, 16A, 16B, 16C for adjusting the optical axis direction includes the cam parts 15a, 15b, 47a and the cam driving parts 19c, 33c, 36b, 50, which are slidably engaged with the cam parts 15a, 15b, 47a and are adapted to pivot the lamp unit 6 in the up-down direction or the right-left direction.

Accordingly, since the cam mechanism is used as a mechanism for pivoting the lamp unit 6, a degree of freedom of structural design is high, and limitation in the arrangement space of each part is less likely to occur. Therefore, it is possible to reduce the size thereof owing to improvement in a degree of freedom of design.

Furthermore, the lamp unit 6 is disposed above the cam parts 15a, 15b, 47a and the cam driving parts 19c, 33c, 36b, 50, and the cam parts 15a, 15b, 47a are pressed against the cam driving parts 19c, 33c, 36b, 50 due to the weight of the lamp unit 6.

Accordingly, it is possible to improve reliability in the pivot operation of the lamp unit 6 while ensuring the size reduction in the front-back direction.

What is claimed is:

1. A vehicle headlamp comprising:
    a lamp outer case including
        a lamp housing formed with an opening on at least one side thereof, and
        a cover that covers the opening of the lamp housing;
    a holding plate that is pivotable in at least one of an up-down direction and a right-left direction;
    a lamp unit that is attached to the holding plate and includes a light source; and
    an optical axis adjustment mechanism that is disposed below the lamp unit and adjusts an optical axis direction of the lamp unit; wherein
    the holding plate is pivotable in one of the up-down direction and the right-left direction,
    the optical axis adjustment mechanism includes a support plate that supports the holding plate so as to be pivotable in the one of the up-down direction and the right-left direction and that is pivotable in the other of the up-down direction and the right-left direction with respect to the lamp housing,
    when the holding plate is pivoted in the one of the up-down direction and the right-left direction, the optical axis direction is adjusted in the up-down direction or the right-left direction by the optical axis adjustment mechanism,
    when the support plate and the holding plate are integrally pivoted in the other of the up-down direction and the right-left direction, the optical axis direction is adjusted in the up-down direction or the right-left direction by the optical axis adjustment mechanism; and
    the light source is disposed above any part of the support plate.

2. The vehicle headlamp according to claim 1, wherein the holding plate and the support plate are arranged one above the other.

3. The vehicle headlamp according to claim 1, wherein
    the holding plate includes a holding part that holds the lamp unit, and the holding part has a frame shape that is penetrated in the up-down direction.

4. The vehicle headlamp according to claim 1, wherein the holding plate is provided integrally with a pivot fulcrum part for the up-down direction.

5. The vehicle headlamp according to claim 1, wherein the optical axis adjustment mechanism includes
   a cam part, and
   a cam driving part that is slidably engaged with the cam part and that pivots the lamp unit in the up-down direction or the right-left direction.

6. The vehicle headlamp according to claim 5, wherein the lamp unit is disposed above the cam part and the cam driving part, and
the cam part is pressed against the cam driving part due to a weight of the lamp unit.

7. The vehicle headlamp according to claim 5, further comprising:
a biasing part that presses the cam part against the cam driving part.

8. The vehicle headlamp according to claim 1, wherein the holding plate includes a cam part, and
the optical axis adjustment mechanism includes a cam driving part that is slidably engaged with the cam part and that pivots the lamp unit in the up-down direction or the right-left direction.

9. The vehicle headlamp according to claim 8, wherein the lamp unit is disposed above the cam part and the cam driving part, and
the cam part is pressed against the cam driving part due to a weight of the lamp unit.

10. The vehicle headlamp according to claim 1, wherein the support plate supports the holding plate so that the holding plate is pivotable in the one of the up-down direction and the right-left direction, and
the support plate is pivotable only in the other of the up-down direction and the right-left direction with respect to the lamp housing.

11. The vehicle headlamp according to claim 1, wherein the lamp unit includes a light source and a reflector, and
the support plate supports the holding plate so that the holding plate, the light source and the reflector are pivotable with respect to the support plate in the one of the up-down direction and the right-left direction.

12. A vehicle headlamp comprising:
a lamp outer case including
   a lamp housing formed with an opening on at least one side thereof, and
   a cover that covers the opening of the lamp housing;
a holding plate that is pivotable in at least one of an up-down direction and a right-left direction;
a lamp unit that is attached to the holding plate and includes a light source; and
an optical axis adjustment mechanism that adjusts an optical axis direction of the lamp unit, wherein
the optical axis adjustment mechanism includes
   a cam part, and
   a cam driving part that is slidably engaged with the cam part and that pivots the lamp unit in the up-down direction or the right-left direction; and
a support plate that supports the holding plate so as to be pivotable in one of the up-down direction and the right-left direction and that is pivotable in the other of the up-down direction and the right-left direction with respect to the lamp housing, wherein
when the holding plate is pivoted in the one of the up-down direction and the right-left direction, the optical axis direction is adjusted in the up-down direction or the right-left direction by the optical axis adjustment mechanism,
when the support plate and the holding plate are integrally pivoted in the other of the up-down direction and the right-left direction, the optical axis direction is adjusted in the up-down direction or the right-left direction by the optical axis adjustment mechanism;
the light source is disposed above any part of the support plate.

13. The vehicle headlamp according to claim 12, wherein the lamp unit is disposed above the cam part and the cam driving part, and
the cam part is pressed against the cam driving part due to a weight of the lamp unit.

14. The vehicle headlamp according to claim 12, wherein the holding plate includes a holding part to which the lamp unit is attached, and
the holding part has a frame shape which is penetrated in the up-down direction.

15. The vehicle headlamp according to claim 12, further comprising:
a biasing part that presses the cam part against the cam driving part.

16. The vehicle headlamp according to claim 12, wherein the support plate supports the holding plate so that the holding plate is pivotable in the one of the up-down direction and the right-left direction, and
the support plate is pivotable only in the other of the up-down direction and the right-left direction with respect to the lamp housing.

17. The vehicle headlamp according to claim 12, wherein the lamp unit includes a light source and a reflector, and
the cam driving part pivots the lamp unit including the light source and the reflector in the up-down direction or the right-left direction.

18. A vehicle headlamp comprising:
a lamp outer case including
   a lamp housing formed with an opening on at least one side thereof, and
   a cover that covers the opening of the lamp housing;
a holding plate that is pivotable in at least one of an up-down direction and a right-left direction;
a lamp unit that is attached to the holding plate and includes a light source; and
an optical axis adjustment mechanism that adjusts an optical axis direction of the lamp unit, wherein
the holding plate includes a cam part, and
the optical axis adjustment mechanism includes a cam driving part that is slidably engaged with the cam part and that pivots the lamp unit in the up-down direction or the right-left direction; and
a support plate that supports the holding plate so as to be pivotable in one of the up-down direction and the right-left direction and that is pivotable in the other of the up-down direction and the right-left direction with respect to the lamp housing, wherein
when the holding plate is pivoted in the one of the up-down direction and the right-left direction, the optical axis direction is adjusted in the up-down direction or the right-left direction by the optical axis adjustment mechanism, and
when the support plate and the holding plate are integrally pivoted in the other of the up-down direction and the right-left direction, the optical axis direction is adjusted in the up-down direction or the right-left direction by the optical axis adjustment mechanism; and the light source is disposed above any part of the support plate.

19. The vehicle headlamp according to claim 18, wherein the lamp unit is disposed above the cam part and the cam driving part, and the cam part is pressed against the cam driving part due to a weight of the lamp unit.

20. The vehicle headlamp according to claim 18, wherein the holding plate includes a holding part to which the lamp unit is attached, and the holding part has a frame shape which is penetrated in the up-down direction.

21. The vehicle headlamp according to claim 18, further comprising:

a biasing part that presses the cam part against the cam driving part.

22. The vehicle headlamp according to claim 18, wherein the support plate supports the holding plate so that the holding plate is pivotable in the one of the up-down direction and the right-left direction, and the support plate is pivotable only in the other of the up-down direction and the right-left direction with respect to the lamp housing.

23. The vehicle headlamp according to claim 18, wherein the lamp unit includes a light source and a reflector, and the cam driving part pivots the lamp unit including the light source and the reflector in the up-down direction or the right-left direction.

* * * * *